(12) United States Patent
Oechslen et al.

(10) Patent No.: US 12,496,894 B2
(45) Date of Patent: Dec. 16, 2025

(54) COOLING SYSTEM FOR AN ELECTRIC TRACTION MACHINE FOR A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Unterheinriet (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 316 days.

(21) Appl. No.: 18/321,816

(22) Filed: May 23, 2023

(65) Prior Publication Data
US 2023/0382215 A1   Nov. 30, 2023

(30) Foreign Application Priority Data
May 30, 2022   (DE) ............... 10 2022 113 566.7

(51) Int. Cl.
| | |
|---|---|
| *B60K 1/00* | (2006.01) |
| *B60K 11/02* | (2006.01) |
| *H02K 7/00* | (2006.01) |
| *H02K 9/19* | (2006.01) |

(52) U.S. Cl.
CPC .............. *B60K 11/02* (2013.01); *H02K 7/006* (2013.01); *H02K 9/19* (2013.01)

(58) Field of Classification Search
CPC .... B60K 11/02; B60K 1/00; B60K 2001/003; B60K 2001/006; H02K 7/006; H02K 9/19; F16H 57/0413
See application file for complete search history.

(56) References Cited

U.S. PATENT DOCUMENTS

| 7,723,874 B2 * | 5/2010 | Woody ................... H02K 9/20 |
| | | 310/52 |
| 10,252,597 B2 | 4/2019 | Wallace et al. |
| (Continued) | | |

FOREIGN PATENT DOCUMENTS

| CN | 102745063 A | * 10/2012 |
| CN | 110281763 B | 11/2020 |
| (Continued) | | |

*Primary Examiner* — Justin Holmes
(74) *Attorney, Agent, or Firm* — LEYDIG, VOIT & MAYER, LTD.

(57) ABSTRACT

A cooling system for an electric traction machine includes a looped conduit system for conducting a first cooling liquid and a circulation pump for conveying the first cooling liquid in a first circulation direction. The cooling system includes an expansion tank filled at least partially with the first cooling liquid and a gas, and a motor input terminal for fluidically connecting the looped conduit system on an input side to the electric traction machine. The cooling system includes a motor output terminal for fluidically connecting the looped conduit system on an output side to the electric traction machine and a first heat exchanger for dissipating heat from and/or supplying heat to the first cooling liquid. In the first circulation direction, the first heat exchanger is arranged downstream of the electric traction machine and connected via the motor input and output terminal and upstream of the expansion tank.

19 Claims, 1 Drawing Sheet

(56) References Cited

U.S. PATENT DOCUMENTS

| | | | |
|---|---|---|---|
| 2012/0327596 A1* | 12/2012 | Anderson-Straley | ........................ H01M 10/625 361/689 |
| 2013/0076126 A1 | 3/2013 | Hashimoto | |
| 2014/0000860 A1 | 1/2014 | Nishizawa et al. | |
| 2021/0351641 A1 | 11/2021 | Dlala et al. | |
| 2023/0387752 A1* | 11/2023 | Kuebler | ................ H02K 7/006 |
| 2024/0059139 A1* | 2/2024 | Oechslen | ................ B60K 1/00 |
| 2024/0063692 A1* | 2/2024 | Oechslen | ............ F16H 57/0435 |

FOREIGN PATENT DOCUMENTS

| | | | | |
|---|---|---|---|---|
| DE | 112011105018 T5 | 12/2013 | | |
| DE | 102017213386 A1 * | 2/2019 | ............. | B60H 1/143 |
| DE | 102018118524 A1 | 2/2019 | | |

\* cited by examiner

COOLING SYSTEM FOR AN ELECTRIC TRACTION MACHINE FOR A MOTOR VEHICLE

CROSS REFERENCE TO RELATED APPLICATIONS

This application claims benefit to German Patent Application No. DE 10 2022 113 566.7, filed on May 30, 2022 which is hereby incorporated by reference herein.

FIELD

The invention relates to a cooling system for an electric traction machine for a motor vehicle. The invention further relates to a thermal management module having such a cooling system for a powertrain of a motor vehicle, a powertrain having such a thermal management module for a motor vehicle, and a motor vehicle having such a powertrain.

BACKGROUND

From the prior art, cooling systems for electric traction machines are known for dissipating the resulting waste heat in case of a power demand. For increased cooling capacity, the idea is to immediately perfuse at least the stator of an electric traction machine with a coolant, wherein the coolant is to be configured as a dielectric cooling liquid. It is sensible to cool as few components as possible in this dielectric cooling system. Other components of a powertrain in which such an electric traction machine is integrated, such as a transmission and a pulse inverter, are preferably cooled in at least one separate cooling circuit. For example, a transmission is cooled by means of an oil circuit such that the coolant (oil) is simultaneously configured so as to lubricate the transmission components. For example, a pulse inverter is arranged in a water circuit, with which further vehicle components are preferably coolable.

The problem with a dielectric cooling liquid is that it is usually more volatile than water. In an expansion tank, therefore, during the discharge of air, there is also a discharge of a gaseous portion of the dielectric cooling liquid as a result of the partial pressure, i.e., excessive losses.

SUMMARY

In an embodiment, the present disclosure provides a cooling system for an electric traction machine for a motor vehicle, comprising a looped conduit system for conducting a first cooling liquid to be circulated and a circulation pump for conveying the first cooling liquid in the looped conduit system in a first circulation direction. The cooling system also comprises an expansion tank filled at least partially with the first cooling liquid to be circulated in the looped conduit system and at least partially with a gas and a motor input terminal for fluidically connecting the looped conduit system on an input side to the electric traction machine to be temperature-controlled. The cooling system also comprises a motor output terminal for fluidically connecting the looped conduit system on an output side to the electric traction machine to be temperature-controlled and a first heat exchanger for dissipating heat from and/or supplying heat to the first cooling liquid to be circulated in the looped conduit system. In the first circulation direction, the first heat exchanger in the looped conduit system is arranged downstream of the electric traction machine to be temperature-controlled and connected via the motor input terminal and the motor output terminal and upstream of the expansion tank.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
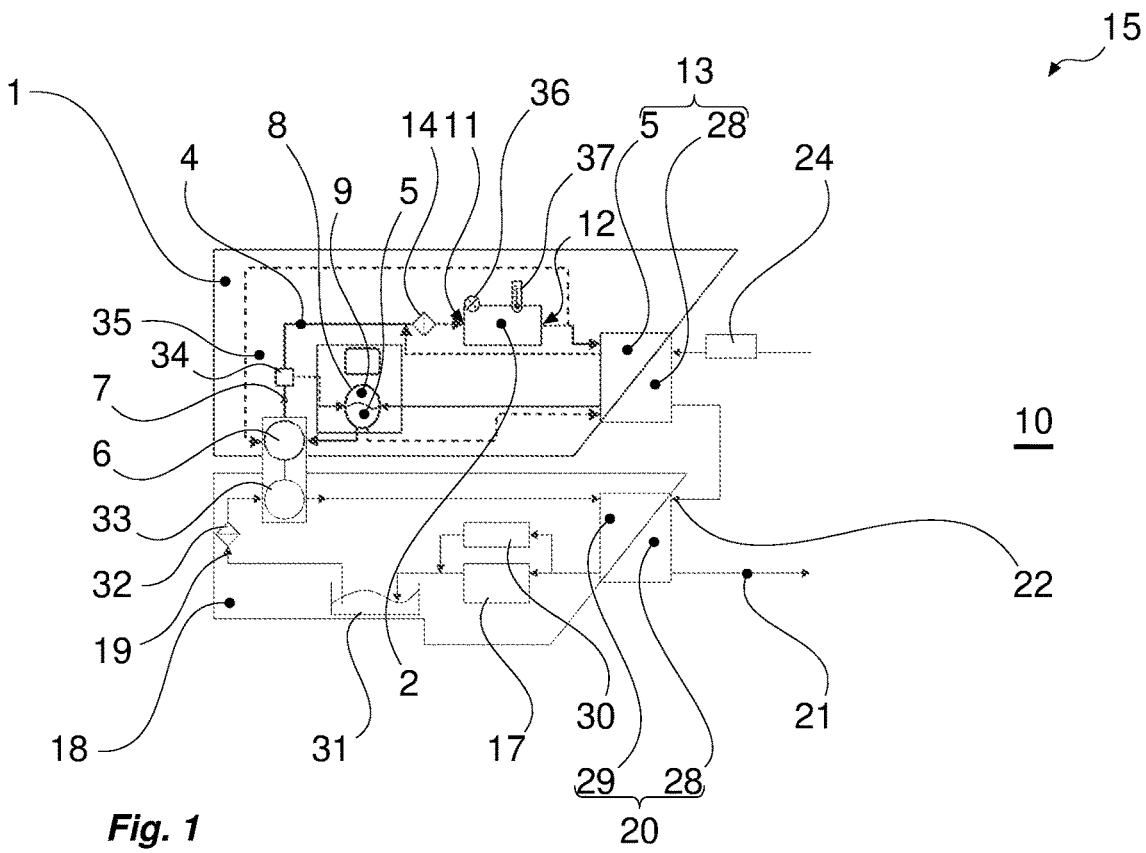
FIG. 1 illustrates a thermal management module in a schematic diagram.

Embodiments of the present invention at least partially overcome the disadvantages known from the prior art. Embodiments of the present invention can be combined in any technically meaningful manner, wherein the explanations from the following description as well as features from the figures, which comprise supplementary configurations of embodiments the invention, can also be used for this purpose.

An embodiment of the invention relates to a cooling system for an electric traction machine for a motor vehicle, comprising at least the following components:

- a looped conduit system for conducting a first cooling liquid to be circulated;
- a circulation pump for conveying the first cooling liquid in the looped conduit system in a first circulation direction;
- an expansion tank filled at least partially with the first cooling liquid to be circulated in the looped conduit system and at least partially with a gas;
- a motor input terminal for fluidically connecting the looped conduit system on the input side to an electric traction machine to be temperature-controlled;
- a motor output terminal for fluidically connecting the looped conduit system on the output side to the electric traction machine to be temperature-controlled; and
- a first heat exchanger for dissipating heat from and/or supplying heat to the first cooling liquid to be circulated in the looped conduit system.

The cooling system is characterized most of all in that in the first circulation direction, the first heat exchanger in the looped conduit system is arranged downstream of an electric traction machine to be temperature-controlled and connected via the motor input terminal and the motor output terminal and upstream of the expansion tank.

Ordinal numbers used in the description above and below are used only for clear differentiation and do not reflect any order or ranking of the designated components, unless explicitly indicated otherwise. An ordinal number greater than one does not necessitate that a further such component must necessarily be present.

In an embodiment of the cooling system described herein, the circumstance that the volatility decreases with the temperature of an (especially dielectric) cooling liquid is exploited. In that the expansion tank is located downstream of the (first) heat exchanger while the electric traction machine (as the main heat source) is located upstream of the (first) heat exchanger, the temperature of the first cooling liquid in the expansion tank is very low down to the lowest temperature in the cooling system. The loss of the first cooling liquid in the expansion tank is thus significantly reduced. This cooling system is particularly advantageous when a dielectric cooling liquid is used as the first cooling liquid, because it is more volatile than water. Nevertheless, the cooling system is also beneficial for other cooling liquids with temperature-based volatility.

In advance, it should be noted that, with an embodiment of the cooling system described here, waste heat must primarily be dissipated, but an increase in the temperature of components temperature-controlled by the cooling system is also a possible operating condition, for example in winter temperatures, so that the components are brought quickly to operating temperature. In most applications, however, waste heat is also to be dissipated in winter temperatures in the operation of an electric traction machine of a motor vehicle, i.e., cooling is the goal.

It should further be noted that, for clarity in terms of components and properties to be described later, components and properties of the cooling system having the same name are respectively designated as "first" components or properties, wherein this is not always done in a clear context.

The cooling system comprises a looped conduit system comprising a plurality of conduits and/or conduit portions between the components of the cooling system. Within the looped conduit system, the first cooling liquid is encapsulated against an environment and thus a loss of gaseous contents occurs there at most in a negligible amount (for example as a result of leakages). A (first) circulation pump is provided for circulating the first cooling liquid. A pressure gradient is generated by the circulation pump, resulting in a (first) circulation direction in the looped conduit system. In an embodiment, the circulation pump is reversibly operable, but the first circulation direction is the main direction of operation, at least when dissipating waste heat from the integrated electric traction machine. A reversal of the direction is adjustable, for example, by reversing the direction of rotation of a pump wheel, but preferably by way of a corresponding way-valve.

The expansion tank is configured so as to equalize the volume between the looped conduit system with an (at least approximately incompressible) first cooling liquid and a compressible gas, for example air from an environment, in order to avoid exceeding a predetermined pressure threshold as a function of changes in temperature in the looped conduit system. Optionally, a further task of the expansion tank is that gas traps in the first cooling liquid are separable as a result of a pressure gradient present to the gas. As described above, this leads to losses of gaseous portions of the first cooling liquid.

An electric traction machine is integrated into the cooling system for temperature control by supplying the first cooling fluid via a motor input terminal and again dissipating the introduced first cooling fluid from the electric traction machine via a motor output terminal. The motor input terminal is preferably connected to the head winding of the electric traction machine and the motor output terminal is connected at the motor-axially opposite end (in relation to the axis of rotation of the rotor shaft of the electric traction machine). It should be noted that when the (first) circulation direction is reversed, an output is formed from the motor input terminal and an input is formed from the motor output terminal. However, preferably, even then, the direction of flow via the electric traction machine remains the same, i.e., the motor input terminal has an input and the motor output terminal has an output for the first cooling liquid, wherein this is achieved, for example, by means of a corresponding conduction and/or at least one switchable way-valve.

The (first) heat exchanger is configured so as to transfer heat between two fluids, i.e., the first cooling liquid and a further fluid (for example water or ambient air). In an embodiment for air cooling, for example, a fan is included.

In an advantageous embodiment, the conductive spacing between the expansion tank and the heat exchanger in the looped conduit system is as short as possible so that heat input is low until the expansion tank is reached. Alternatively or additionally, a conduction section between the expansion tank and the heat exchanger in the looped conduit system is thermally isolated and/or spaced as far apart as possible from other heat sources, in particular from the electric traction machine to be temperature-controlled.

It is further provided, in an advantageous embodiment of the cooling system, that the looped conduit system comprises a filter arranged on the conduit side upstream of the motor input terminal.

In this embodiment, a filter for retaining particles in the looped conduit system is provided in order to protect the electric traction machine, but also the (first) heat exchanger and/or other components in the cooling system against abrasive damage and/or to prevent the clogging of conduit bottlenecks. The position in the looped conduit system upstream on the conduit side, preferably immediately upstream of the motor input terminal, is particularly advantageous, because particles are newly generated or swirled up by the circulation pump. The electric traction machine is particularly sensitive to (especially metallic, i.e., electrically conductive) particles due to the low channel cross-sections and the required power density or efficiency. In addition, in the (first) circulation direction, the (first) heat exchanger, which is also sensitive, is arranged downstream of the electric traction machine and is thus also efficiently protected by means of the filter. It should further be noted that the electric traction machine is arranged upstream of the heat exchanger and the expansion tank, preferably nearly immediately downstream of the circulation pump. Thus, there are high pressures in the first cooling liquid, so that an abrasive effect of particles would most often and most frequently occur in the electric traction machine without the filter. On the conduit side upstream of the motor input terminal, in the looped conduit system, the flowed proceeds the first circulation direction upstream of the motor input terminal and, on the motor side downstream of the motor input terminal, the flow proceeds in the looped conduit system downstream of the motor input terminal. This definition will apply analogously in the following.

It is further provided in an advantageous embodiment of the cooling system that the first heat exchanger be a dielectric-water heat exchanger.

In this embodiment, the waste heat of the electric traction machine to be temperature-controlled can be passed off to a water circuit. In an advantageous embodiment, the water circuit is configured for further vehicle components, preferably for a pulse inverter for the electric traction machine to be temperature-controlled. In a preferred embodiment, the first heat exchanger is the only liquid-bonded heat sink of the cooling system with the first cooling liquid.

It is further provided in an advantageous embodiment of the cooling system that, in the looped conduit system, the order in the first circulation direction of the expansion tank, the first heat exchanger, and an electric traction machine to be temperature-controlled and connected via the motor input terminal and motor output terminal is reversible.

As already mentioned above, the pressure on the electric traction machine to be temperature-controlled is highest due to the order of the components in the cooling system. Thus, in an operating state where a high throughput rate is required, it may be advantageous to reverse the first direction of circulation, or to reverse the order of components in the looped conduit system as a result of a corresponding valve position. Then, the electric traction machine to be temperature-controlled is arranged (preferably directly) downstream of the (first) heat exchanger so that the first cooling liquid is then very (preferably maximally) cold. A throughput rate is thus decreasable and thus the pressure can also be reduced again. If this is not possible, however, due to the order, the highest pressure in the conduit is already not found with the electric traction machine due to the throttling effects in the upstream components in this state.

According to a further aspect, a thermal management module for a powertrain of a motor vehicle is provided, comprising at least the following components:

for a transmission, an oil circuit having a second circulation direction and having a second heat exchanger;

for at least one vehicle component, a water circuit having a third circulation direction and having a third heat exchanger; and for an electric traction machine, a cooling system according to an embodiment according to the above description, wherein, preferably, a pulse inverter for the electric traction machine is arranged in the water circuit.

Here, the cooling system described above is integrated into a thermal management module for a powertrain of a motor vehicle, wherein this thermal management module [TMM] is well known for its functions and tasks. In addition to components of a powertrain, other vehicle components are preferably also temperature-controlled, for example a (preferably traction) battery.

For example, a transmission comprising a (preferably switchable) gear box and/or a differential is cooled by way of an oil circuit with an oil, preferably directly. A direct cooling is a flow that directly contacts component of the transmission (for example gears), for example as a substitute for a lubricant. For example, the oil circuit is conventional. In an advantageous embodiment, a second circulation pump for generating a second circulation direction in the oil circuit is coupled to the first circulation pump for generating the first circulation direction in the looped conduit system for the first cooling liquid as a so-called tandem pump, such that a single drive is sufficient for both circulation pumps. The waste heat is thereby released via the second heat exchanger.

It should be noted that the respective components are also heatable in the oil circuit and/or the water circuit, for example in winter temperatures, wherein but the main state here is also the dissipation of waste heat. The respective circulation direction is also reversible, where appropriate.

In an advantageous embodiment, a pulse inverter [PWR] for an electric traction machine to be temperature-controlled by the cooling system with the first cooling liquid is arranged in the water circuit for temperature control, i.e., not a component to be temperature-controlled in the cooling system with the first cooling liquid. It is advantageous to keep the number of components in said cooling system for an electric traction machine low. With a pulse inverter, the use of a dielectric (first) cooling liquid is not necessary. It is therefore advantageous to arrange the pulse inverter outside of said cooling system.

In an advantageous embodiment of the thermal management module, the water circuit may be connected to the first heat exchanger of the cooling system for an electric traction machine for heat transfer, preferably as the only liquid-bonded heat transfer of the cooling system to the environment, wherein, preferably in the third circulation direction of the water circuit, a pulse inverter for an electric traction machine is arranged upstream of the first heat exchanger.

In an embodiment, the cooling system may be heat-coupled to the first cooling liquid and the water circuit, i.e., the water circuit is configured by means of the (first) heat exchanger for temperature control of the first cooling liquid. Thus, in the first heat exchanger, for example upon cooling of the electric traction machine (technically without liquid exchange), the heat is released from the first cooling liquid to the water in the water circuit.

In a preferred embodiment, no further (forced) convection is provided for temperature control of the electric traction machine (and preferably also not further components in the cooling system) and for dissipating heat from the first cooling liquid. Rather, the first heat exchanger is then the only unit of the cooling system for transferring heat, namely with the water circuit.

In a preferred embodiment, the pulse inverter is arranged in the (third) circulation direction of the water circuit upstream of the first heat exchanger so that the temperature gradient above the pulse inverter is as large as possible, while the temperature gradient above the first heat exchanger (due to the mostly very large heat output of the electric traction machine) is still sufficient.

In an advantageous embodiment, a reversing valve is provided for reversing the (first) circulation direction. In an embodiment, the first cooling liquid then passes through a separate return channel. Preferably, the same conduit is used for both directions.

Thus, in the main direction, the order of the components is (beginning with the first circulation pump):
1. the first circulation pump
2. the electric traction machine;
3. the first heat exchanger; and
4. the expansion tank.

And, in the minor direction, the order of the components is:
1'. the first circulation pump;
2'. the expansion tank;
3. the first heat exchanger; and
4'. the electric traction machine.

It should be noted that possible further components in the cooling system are also supplied in reverse, or only a few or exclusively the aforementioned three components are supplied in reverse order.

In an advantageous embodiment of the thermal management module, the water circuit may also be connected to the second heat exchanger of the oil circuit for heat transfer, preferably as the only liquid-bonded heat transfer of the cooling system to the environment, wherein, preferably in the third circulation direction of the water circuit, the first heat exchanger is arranged upstream of the second heat exchanger.

In an embodiment, the oil circuit and the water circuit may be heat-coupled to one another, i.e., the water circuit is configured by means of the (second) heat exchanger for temperature control of the oil. In the second heat exchanger, for example, when the transmission cools (technically without liquid exchange), the heat from the oil in the oil circulation is released to the water in the water circuit.

In a preferred embodiment, no further (forced) convection is provided for temperature control of the transmission (and preferably also not for further components in the oil circuit) and for dissipating heat from the oil. Rather, the second heat exchanger is then the only unit of the oil circuit for heat transfer, namely with the water circuit.

In a preferred embodiment, the first heat exchanger is arranged in the (third) circulation direction of the water circuit upstream of the second heat exchanger so that the temperature gradient above the first heat exchanger is as large as possible, while the temperature gradient above the second heat exchanger (due to the mostly higher permissible temperature level in a transmission in comparison to an electric traction machine) is still sufficient.

According to a further aspect, a powertrain for a motor vehicle is provided, comprising at least the following components:
- at least one electric traction machine for providing a torque;
- at least one propulsion wheel for propelling the relevant motor vehicle by means of a torque of the electric traction machine;
- at least one transmission for conducting a torque between the electric traction machine and at least one of the propulsion wheels; and
- a cooling system according to an embodiment according to the above description for at least one of the electric traction machines and/or a thermal management module according to an embodiment according to the above description for at least one of the electric traction machines, at least one of the transmissions and at least one vehicle component, and preferably a pulse inverter for at least one of the electric traction machines.

In an embodiment, a powertrain is provided, which comprises at least one electric traction machine by means of which torque is generated. The torque of the respective electric traction machine is transferable via a transmission to at least one propulsion wheel. The at least one propulsion wheel is configured so as to drive the motor vehicle forward. The temperature control of the components of the powertrain is performed by a cooling system or a thermal management module comprising a cooling system according to an embodiment according to the above description. For the third heat exchanger, the air of the environment is preferably used, namely passively by means of driving wind and/or actively by means of a fan.

In a further aspect, a motor vehicle is provided, comprising a chassis having a transport cell and a powertrain according to an embodiment according to the description above for driving the automotive vehicle forward.

The motor vehicle is provided for transporting at least one passenger and/or goods and comprises a passenger compartment and/or a cargo cell. The motor vehicle is driven via the at least one propulsion wheel by means of the torque of at least one of the electric traction machines.

Embodiments of the invention described above are explained in detail below with reference to the accompanying drawings, which show preferred configurations, in light of the relevant technical background. Embodiments of the invention are not limited in any way by the purely schematic drawings, wherein it is noted that the drawings are not true to size and are not suitable for defining proportions.

In FIG. 1, a thermal management module 15 is shown in a schematic diagram, which comprises a cooling system 1 for an electric traction machine 2. A first heat exchanger 13 of the cooling system 1 is configured here for heat transfer with a water circuit 21 (only shown in detail here), so that the first cooling liquid 5 of the looped conduit system 4 of the cooling system 1 and the water 28 (mixture) of the water circuit 21 are in heat exchange with each other. A second heat exchanger 20 of an oil circuit 18 for a transmission 17 is also configured here for heat transfer with the water circuit 21 (shown only in a section here), so that the oil 29 of the oil circuit 18 and the water 28 (mixture) of the water circuit 21 are in heat exchange with each other.

In the water circuit 21, a pulse inverter 24 for the electric traction machine 2 to be temperature-controlled in the cooling system 1 is arranged here, namely in the (third) circulation direction 22 of the water circuit 21 upstream of the first heat exchanger 13 of the cooling system 1 with the first cooling liquid 5. In addition, the second heat exchanger 20 is arranged downstream of the first heat exchanger 13 in the third circulation direction 22.

In the oil circuit 18, in the (second) circulation direction 19, a transmission 17 and a transmission component 30 are arranged downstream of the second heat exchanger 20, which are connected here in parallel. Subsequently, an oil sump 31, consequently a coarse filter 32 and finally (shown in the illustration) a second circulation pump 33, are arranged in the oil circuit 18. The second circulation pump 33 is herein (purely optionally) embodied as a tandem pump with a first circulation pump 6 of the cooling system 1 having the first cooling liquid 5.

The cooling system 1 comprises a looped conduit system 4 in which the following components are arranged in the (first) circulation direction 7 (and, as before, in the stated order):
1. a first circulation pump 6;
2. the electric traction machine 2, which is perfused via a motor input terminal 11 and a motor output terminal 12; and
3. the first heat exchanger 13; and
4. an expansion tank 8.

As optional components, the filter 14 upstream of the motor input terminal 11, as well as a reversing valve 34 explained below, are shown in the looped conduit system 4. The expansion tank 8 is filled partially with the first cooling liquid 5 and partially with a gas 9, and thus a pressure increase resulting from a temperature-related increase in volume via the compressible gas 9 can be adjusted or at least mitigated.

In the embodiment shown, there is further shown a reversing channel 35 and a reversing valve 34, wherein a further conduit (shown as dashed line) is shown here solely for ease of representation compared to the main direction (solid line) of the first circulation direction 7. Preferably, the same conduit is used and only in the secondary operation is perfused in reverse direction. It should be noted that in the embodiment shown, the section of the looped conduit system 4 in the electric traction machine 2 is always perfused in the same direction, i.e., the flow proceeds through the motor input terminal 11 towards the motor output terminal 12. Here, a pressure sensor 36 is further shown at the motor input terminal 11 in order to enable a control of the reversing valve 34 based on a pressure. Alternatively or additionally, a temperature sensor 37 is provided in order to sense a temperature in the electric traction machine 2 (in this case purely optionally on the output side, for example).

It should be noted that, in the embodiment of the thermal management module 15 shown, no heat exchanger is provided from the cooling system 1 and the oil circuit 18 for heat transfer to the environment 10. Rather, the first heat exchanger 13 and the second heat exchanger 20 are coupled to the water circuit 21.

Figure 2:
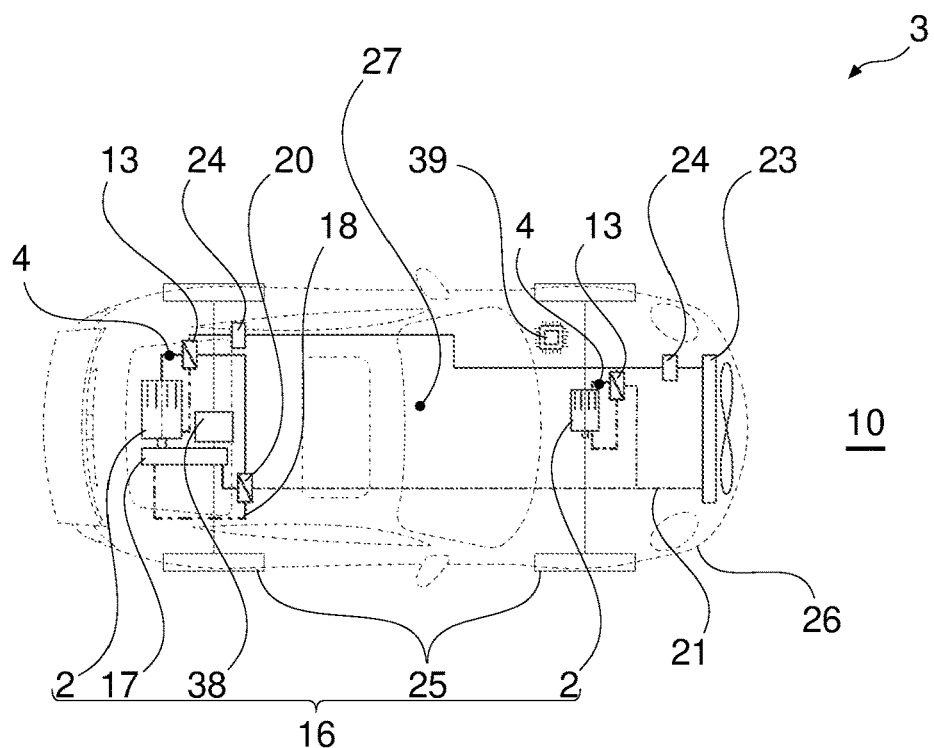
FIG. 2 illustrates a motor vehicle having a thermal management module in a schematic top view.

In FIG. 2, a motor vehicle 3 with a thermal management module 15 is shown in a schematic top plan view with a powertrain 16. The motor vehicle 3 comprises a transport cell 27, for example a passenger compartment, approximately in the center of its chassis 26, and four propulsion wheels 25 to propel the motor vehicle 3 on and to the side of its chassis 26. In front, there is an electric traction machine 2 (optionally purely coaxial here) and in rear, there is a further electric traction machine 2 (in this case purely optionally axially arranged), and in the rear, there is a transmission 17 and a differential 38, preferably wherein the differential 38 is integrated into the oil circuit 18. A pulse inverter 24 is provided for each of the front and rear electric traction machines 2. A water circuit 21 is configured for the temperature control of the pulse inverter 24 and the first heat exchangers 13 and the second heat exchanger 20, wherein the heat of the water circuit 21 can be dissipated to the environment 10 via a third heat exchanger 23 (shown here with a fan). The leading conduit is shown here with a solid line and the return line respectively as a dotted line so that the (third) circulation direction 22 of the water circuit 21 runs counterclockwise in the illustration. Likewise, this is shown in the cooling system 1 on the electric traction machines 2 and in the oil circuit 18. For example, the cooling systems 1, the oil circuit 18, and the water circuit 21 are embodied as shown in FIG. 1 (at least excerpts thereof). Furthermore, a processor 39 is indicated here by means of which the necessary control and/or control of the shown (and possibly further) components can be implemented. The processor 39 is configured as a CPU, for example, and/or is part of an on-board computer of the motor vehicle 3.

An embodiment of the invention relates to a cooling system for an electric traction machine for a motor vehicle, comprising at least the following components:

a looped conduit system for conducting a first cooling liquid to be circulated;

a circulation pump for conveying the first cooling liquid in a first circulation direction;

an expansion tank;

a motor input terminal for fluidically connecting the looped conduit system on the input side to an electric traction machine to be temperature-controlled;

a motor output terminal for fluidically connecting the looped conduit system on the output side to the electric traction machine to be temperature-controlled; and a first heat exchanger for dissipating heat from and/or supplying heat to the first cooling liquid to be circulated in the looped conduit system. The cooling system is characterized most of all in that in the first circulation direction, the first heat exchanger in the looped conduit system is arranged downstream of an electric traction machine to be temperature-controlled and connected via the motor input terminal and the motor output terminal and upstream of the expansion tank.

With the cooling system described herein, a loss of dielectric cooling liquid can be decreased.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Cooling system
2 Electric traction machine
3 Motor vehicle
4 Looped conduit system
5 First cooling liquid
6 First circulation pump
7 First circulation direction
8 Expansion tank
9 Gas
10 Environment
11 Motor input terminal
12 Motor output terminal
13 First heat exchanger
14 Filter
15 Thermal management module
16 Powertrain
17 Transmission
18 Oil circuit
19 Second circulation direction
20 Second heat exchanger
21 Water circuit
22 Third circulation direction
23 Third heat exchanger
24 Pulse inverter
25 Drive wheel
26 Chassis
27 Transport cell
28 Water
29 Oil
30 Transmission component
31 Oil sump
32 Coarse filter
33 Second circulation pump
34 Reversing valve
35 Reversing channel
36 Pressure sensor
37 Temperature sensor
38 Differential
39 Processor

The invention claimed is:

1. A cooling system for an electric traction machine for a motor vehicle, comprising:

a looped conduit system for conducting a first cooling liquid to be circulated;

a circulation pump for conveying the first cooling liquid in the looped conduit system in a first circulation direction;

an expansion tank filled at least partially with the first cooling liquid to be circulated in the looped conduit system and at least partially with a gas;

a motor input terminal for fluidically connecting the looped conduit system on an input side to the electric traction machine to be temperature-controlled;

a motor output terminal for fluidically connecting the looped conduit system on an output side to the electric traction machine to be temperature-controlled; and a first heat exchanger for dissipating heat from and/or supplying heat to the first cooling liquid to be circulated in the looped conduit system, wherein in the first circulation direction, the first heat exchanger in the looped conduit system is arranged downstream of the electric traction machine to be temperature-controlled and connected via the motor input terminal and the motor output terminal and upstream of the expansion tank.

2. The cooling system according to claim 1, wherein the looped conduit system comprises a filter arranged on a conduit side upstream of the motor input terminal.

3. The cooling system according to claim 1, wherein the first heat exchanger is a dielectric-water heat exchanger.

4. The cooling system according to claim 1, wherein in the looped conduit system, an order in the first circulation direction of the expansion tank, the first heat exchanger, and an electric traction machine to be temperature-controlled and connected via the motor input terminal and the motor output terminal is reversible.

5. The cooling system according to claim 1, wherein the expansion tank is arranged immediately downstream of the first heat exchanger and immediately upstream of the circulation pump, wherein the expansion tank is further arranged upstream of a filter, and wherein the circulation pump is arranged upstream of the motor input terminal.

6. The cooling system according to claim 1, wherein the gas of the expansion tank is a compressible gas, and wherein the compressible gas is separable from the first cooling liquid based on a pressure gradient present to the gas.

7. The cooling system according to claim 1, wherein a filter is arranged downstream of the expansion tank and the first heat exchanger.

8. The cooling system according to claim 1, wherein the electric traction machine is coaxial to a propulsion wheel.

9. A thermal management module for a powertrain of a motor vehicle, comprising:

for a transmission, an oil circuit having a second circulation direction and having a second heat exchanger;

for at least one vehicle component, a water circuit having a third circulation direction and having a third heat exchanger; and for an electric traction machine, the cooling system according to claim 1.

10. The thermal management module according to claim 9, wherein
the water circuit is connected to the first heat exchanger of the cooling system for an electric traction machine for heat transfer.

11. The thermal management module according to claim 10, wherein
the water circuit is connected to the first heat exchanger of the cooling system for an electric traction machine for heat transfer as the only liquid-bonded heat transfer of the cooling system to the environment.

12. The thermal management module according to claim 10, wherein
in the third circulation direction of the water circuit, a pulse inverter for an electric traction machine is arranged upstream of the first heat exchanger.

13. The thermal management module according to claim 10, wherein
the water circuit is additionally connected to the second heat exchanger of the oil circuit for heat transfer.

14. The thermal management module according to claim 13, wherein
the water circuit is additionally connected to the second heat exchanger of the oil circuit for heat transfer as the only liquid-bonded heat transfer of the cooling system to the environment.

15. The thermal management module according to claim 13, wherein
in the third circulation direction of the water circuit, the first heat exchanger is arranged upstream of the second heat exchanger.

16. The thermal management module of claim 9, wherein a pulse inverter for the electric traction machine is arranged in the water circuit.

17. A powertrain for a motor vehicle, comprising:

at least one electric traction machine for providing a torque;

at least one propulsion wheel for propelling the motor vehicle by a torque of the electric traction machine;

at least one transmission for conducting a torque between the electric traction machine and at least one of the at least one propulsion wheels; and the thermal management module according to claim 9 for at least one of the electric traction machines, at least one of the transmissions, at least one vehicle component, and a pulse inverter for at least one of the at least one electric traction machines.

18. A powertrain for a motor vehicle, comprising:

at least one electric traction machine for providing a torque;

at least one propulsion wheel for propelling the motor vehicle by a torque of the electric traction machine;

at least one transmission for conducting a torque between the electric traction machine and at least one of the at least one propulsion wheels; and the cooling system according to claim 1.

19. A motor vehicle comprising a chassis having a transport cell and the powertrain according to claim 18 for driving the motor vehicle forward.

* * * * *